United States Patent [19]

Reiser

[11] 3,964,930
[45] June 22, 1976

[54] FUEL CELL COOLING SYSTEM
[75] Inventor: Carl A. Reiser, Glastonbury, Conn.
[73] Assignee: United Technologies Corporation, Hartford, Conn.
[22] Filed: July 21, 1975
[21] Appl. No.: 597,614

[52] U.S. Cl. ............................................. 136/86 R
[51] Int. Cl.² ........................................ H01M 8/04
[58] Field of Search ............... 136/86 R, 86 E, 86 B, 136/86 C

[56]  References Cited
UNITED STATES PATENTS
3,923,546  12/1975  Katz et al. .......................... 136/86 R Primary Examiner—John H. Mack
Assistant Examiner—H. A. Feeley
Attorney, Agent, or Firm—Stephen E. Revis

[57] ABSTRACT

A cooler for removing waste heat from a stack of fuel cells includes a plurality of tubes for carrying the coolant through the stack. The tubes are disposed adjacent the nonelectrolyte side of electrodes in the stack in grooves or passageways formed in the surface of plates which separate one cell in the stack from another. Since the tubes are exposed to the electrolyte used in the stack they must be made from or at least include a protective coating of material which is stable in the electrolyte. Preferably this material is also a dielectric to prevent shunt currents from passing into the tubes and coolant which may be water.

9 Claims, 4 Drawing Figures

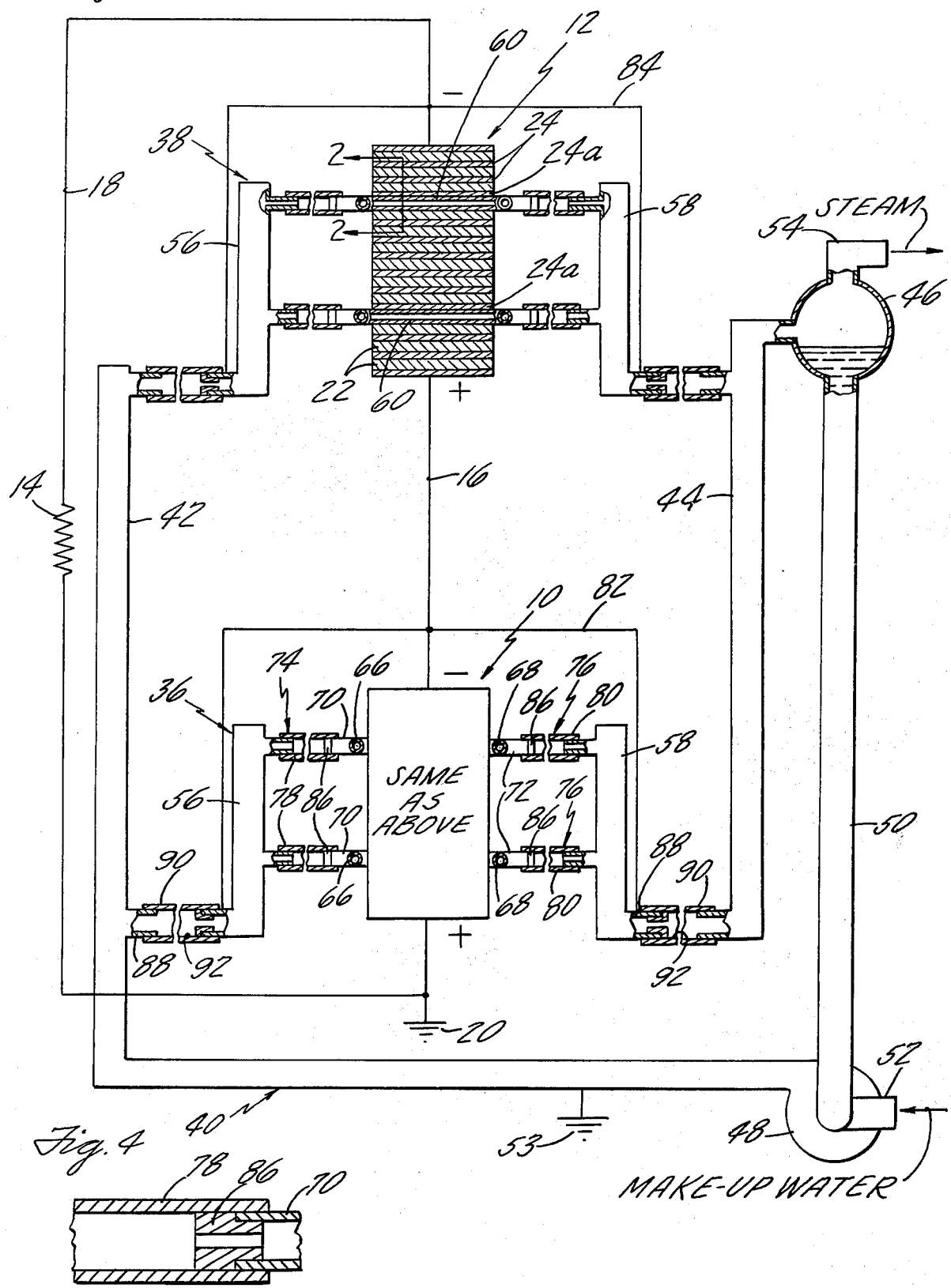

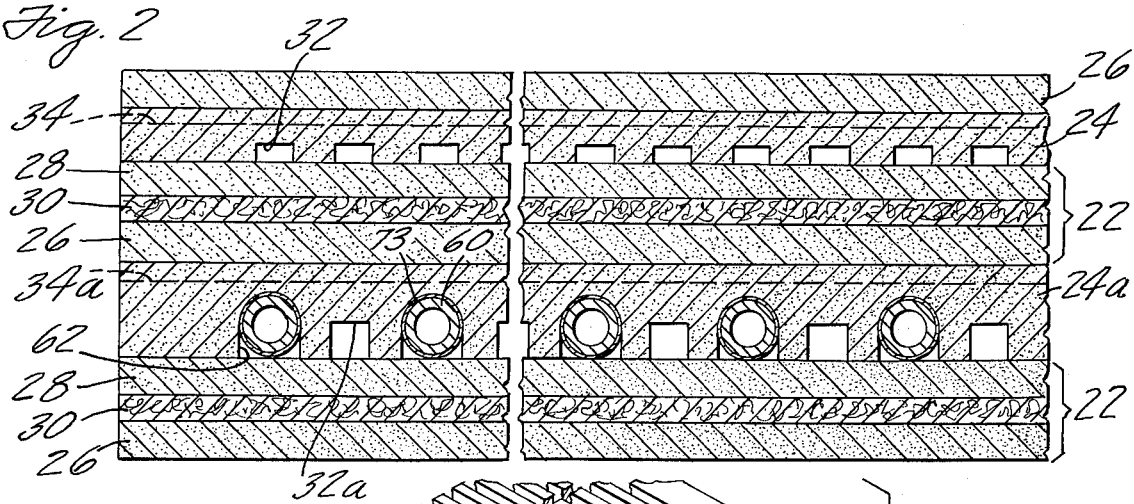
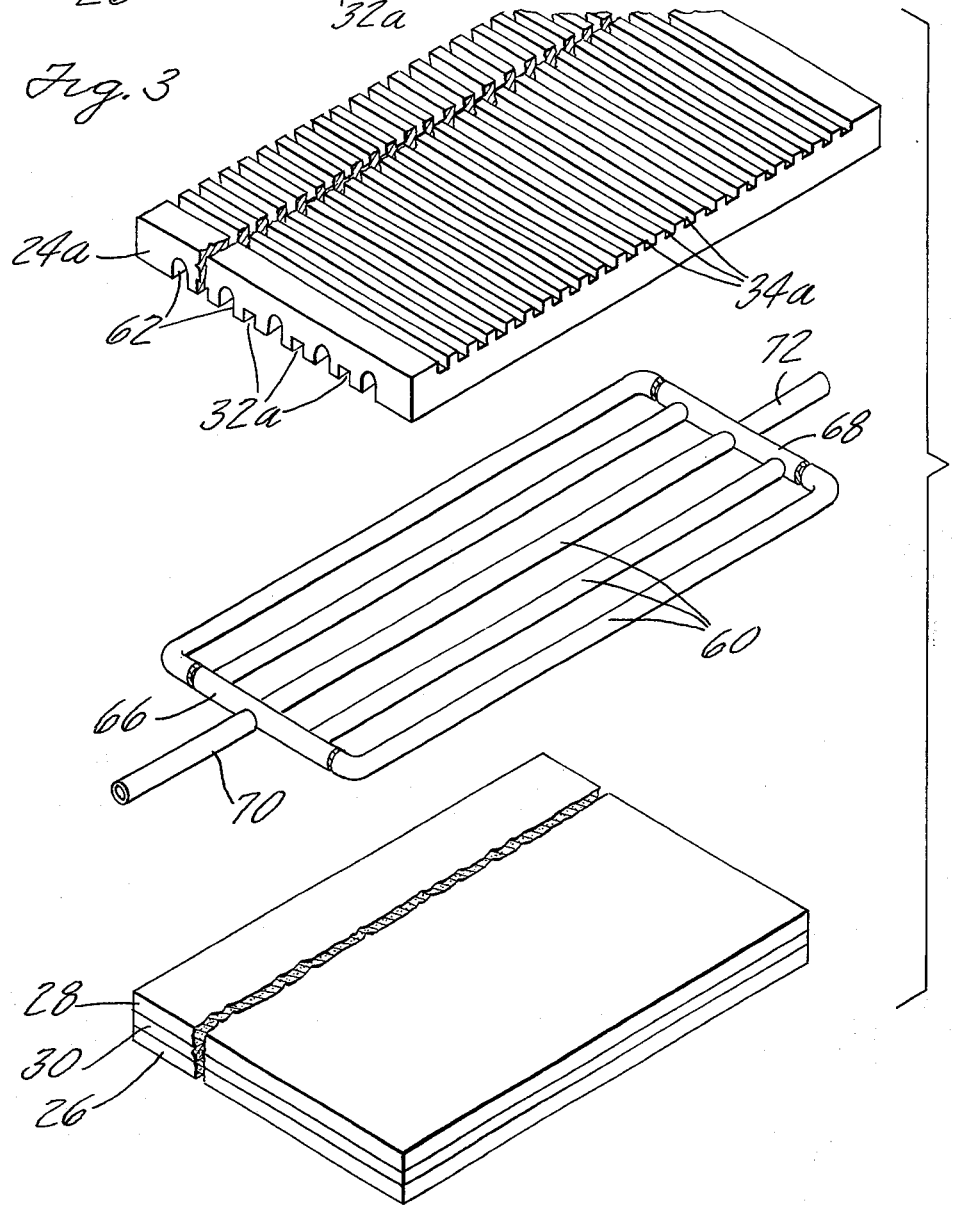

FUEL CELL COOLING SYSTEM

BACKGROUND OF THE INVENTION

1. Field of the Invention

This invention relates to fuel cells and more particularly to means for removing waste heat from fuel cells.

2. Description of the Prior art

A fuel cell power section comprises a plurality of individual cells electrically connected in series. The cells convert reactants, such as a hydrogen containing fuel and air or other oxidants, into DC electrical power in a manner well known in the art. The cells are housed between separator plates which provide flow passages to bring the reactants to the cell. The electrochemical reaction produces, as a by-product, waste heat which must be removed in a controlled manner to maintain the cells at the desired operating temperature. For efficient operation it is desirable to maintain the cells at a uniform temperature and at a maximum level consistent with material compatibility characteristics.

A well-known method for removing waste heat from a fuel cell power section is to use heat exchange surfaces parallel to the plane of the cells. these heat exchange surfaces often take the form of passageways through the separator plates forming conduits which carry a coolant fluid. The intimate contact between the coolant fluid and the separator plates provides high heat transfer capabilities between the cells and the cooling medium thereby minimizing the temperature gradient therebetween. Depending upon the power density and thermal properties of the fuel cell power section, coolant passageways could be used between every cell or coolant passgeways between one pair of cells could be used to remove heat from several cells, the latter being more typical.

Since the cooling system is an integral part of the power section, it is exposed to the electrical potentials of the cells. In large power sections this can be hundreds or even thousands of volts. It is important, therefore, that there be no apreciable flow of electrical current (i.e., shunt currents) between the cells and ground through the cooling loop. These shunt currents could cause serious corrosion of power section components and/or piping and could result in potentially large parasitic power losses. For this reason fuel cell cooling systems have traditionally used dielectric fluids as the coolant since they cannot conduct electric current. Although this eliminates the problems associated with shunt currents in the cooling loop, there are associated disadvantages. For example, dielectric fluids such as fluorocarbon or silicon based oils, which are capable of operating at fuel cell temperatures are expensive. The low specific heat of dielectric coolants require high mass flow rates through the cells, with a resultant loss of power due to the energy consumed by the coolant pumps. The higher flow rates require larger flow passage sizes leading to an increase in the size and cost of the power section and its connecting plumbing.

In addition to the foregoing there are other disadvantages of using dielectric coolants. The amount of heat transferred to the dielectric coolant is a function of the difference between its temperature at the inlet to the cell and its temperature at the exit of the cell. If the cell temperture is not allowed to go above a certain maximum level, a majority of the cell area will necessarily operate at a temperature lower than this maximum temperature resulting in a temperature skew across the cell. This reduces the cell output and overall efficiency. Also, cells are highly sensitive to dielectric fluids. Even trace amounts of a dielectric coolant leaking into the cells can seriously degrade or even totally ruin cell performance. This potential problem is in addition to the fact that the dielectric coolants are flammable and have toxic products of reaction. The foregoing problems are complicated by the fact that dielectric coolants have low surface tension properties which makes them extremely difficult to seal.

SUMMARY OF THE INVENTION

One object of the present invention is a system for cooling fuel cell power sections which avoids the foregoing disadvantages. Another object of the present invention is a highly efficient system for cooling fuel cell power sections which requires a minimum of space both external and internal of the power section.

Accordingly, the present invention is a fuel cell cooler wherein the coolant is carried between cells in tubes which are disposed adjacent the electrode of a cell in passageways formed in the surface of a separator plate. To state this in another way, the tubes carrying the coolant may be thought of as being disposed in the area of the stack normally used for carrying a reactant gas into contact with the cell electrode. In a preferred embodiment the tubes are electrically insulated from the cells and water is used as the coolant.

A single fuel cell power section or stack of cells according to a preferred embodiment will include a plurality of cooler tubes wihin at last one separator plate in the stack. The tubes may be made from any dielectric material which can withstand cell operating temperatures and is compatible with reactants and other cell components. Alternatively, tubes of electrically conductive material may be used if coated with a dielectric material, such as a fluorocarbon polymer, to electrically isolate the tubes and cooling fluid from the separator plate potentials and to protect the conductive tube material from corrosion due to the stack internal environment.

To prevent the flow of appreciable current between the cells and ground (i.e., a short circuit) through the coolant, in case of flaws in the coating or degradation of the coating, the cooling system may include a high electrical resistance path between the cooler tubes and a grounded cooling water supply system. Also, each cooler tube or a group of tubes may be connected to the stack coolant manifolds by dielectric hoses having a high length to diameter ratio. This connecting tube configuration in conjunction with cooling water of low to moderate electrical conductivity is used to provide a several hundred thousand ohm impedance path through the coolant. These features are more fully described hereinafter and in U.S. Pat. Applications titled "Fuel Cell Cooling System Using a Non-dielectric Coolant" by Paul Grevstad and Raymond Gelting and "Fuel Cell Cooling System with Shunt Current Protection" by Paul Grevstad, both filed on even date herewith and having a common assignee with the present application.

Another feature of a preferred embodiment of the present invention is a sacrificial electrode (i.e., anode) in a non-structural region of the cooler tubes or coolant manifolds. The cooler system is designed so that a low rate of electrogalvanic corrosion takes place at the sacrificial anode material, thereby ensuring that the integrity of structural components of the stack is maintained during the several years that the system is in operation. These and other features of the present invention hereinafter described result in long stack life and predictable operation.

Having overcome the major obstacles to using a non-dielectric coolant, the properties of water show it to be a superior coolant. Not only is water a very inexpensive coolant, its low boiling point permits the removal of waste heat from the cells by evaporation at practical pressure levels. As the water evaporates it absorbs heat at a constant temperature, thus permitting the cells to operate at a uniform temperature from inlet to exit. Because the boiling temperature of the water is a function of the pressure, the temperature level of the cells may be controlled by varying the pressure level in the water/steam coolant loop. Water's very high heat of evaporation means that large amounts of heat may be transferred per unit of mass of water circulated through the cooler, thereby reducing coolant flow rates by several orders of magnitude as compared to dielectric or non-boiling coolants. This, in turn, results in smaller piping sizes and less parasite power for pumping the coolant. Furthermore, it is not harmful to the cells if small quantities of water leak from the tubes. And, of course, water is not toxic.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 1 is a schematic sectional view of part of a fuel cell power plant having two fuel cell stacks connected to each other electrically in series and incorporating the features of the present invention.

FIG. 2 is an enlarged sectional view taken along the line 2—2 of FIG. 1.

FIG. 3 is an illustrative, exploded perspective view of a separator plate, fuel cell and cooler tubes in one of the stacks of FIG. 1.

FIG. 4 is an enlarged cross-sectional view of the sacrificial electrode used in the stacks of FIG. 1.

DESCRIPTION OF THE PREFERRED EMBODIMENT

As an exemplary embodiment of the present invention, consider the fuel cell power plant cooling system depicted in FIG. 1. The power plant includes a pair of fuel cell stacks 10, 12, respectively. The number of stacks shown is by way of example only, since the present invention is applicable to even a single stack or any larger number of stacks. In this embodiment, and in other embodiments including more than one stack, the stacks are connected electrically in series to each other and across a load 14, such as by the electrical connection 16, 18. The stacks 10, 12 are electrically grounded at 20.

Each stack 10, 12 comprises a plurality of cells 22. Separator plates 24, 24a, which may, for example, be made of graphite, separate each pair of adjacent cells. the plates 24, 24a are electrically conductive and serve to electrically connect the individual cells 22 in series.

The cells 22 and the plates 24, 24a are best shown in FIG. 2. Each cell 22 comprises a cathode electrode 26 spaced apart from an anode electrode 28 by an electrolyte retaining matrix 30. The electrolyte in this embodiment is phosphoric acid. Channels 32, 32a in one surface of the separator plates 24, 24a, respectively, carry an oxidant into communication with the cathode electrodes 26. Channels 34, 34a in an oppositely facing surface of the separator plates 24, 24a, respectively, carry a reactant into communication with the anode electrodes 28. The oxidant carrying channels are perpendicular to the reactant carrying channels, each extending from one side of the plate to the other and being fed by manifolds which are not shown. In this embodiment the electrodes are of the well known gas diffusion type suitable for use with air as the oxidant and a hydrogen-containing gas as the reactant. The foregoing description of the cells 22 and the plates 24, 24a are by way of example only, for the purposes of describing this preferred embodiment; it is not intended to limit the scope of the present invention to any particular type of cell or to any specific plate material or configuration.

Returning again to the cooling system of FIG. 1, each stack 10, 12 includes a cooler 36, 38, respectively. The coolers 36, 38 are designed to carry a non-dielectric coolant into heat transfer relationship with the cells 22 of their respective stack. In this preferred embodiment the coolant is water. The cooling system also includes a circulation system 40. The circulation system 40 includes a coolant supply line 42 for delivering water into the coolers 36, 38; a coolant collection line 44 for collecting the exiting coolant in the form of liquid water and steam exiting from the coolers 36, 38; a steam separator 46 for separating steam from liquid water; a pump 48 for circulating the water through the cooling system; and, a conduit 50 for returning liquid water from the separator 46 to the coolant supply line 42.

The circulation system 40 also includes a conduit 52 for adding make up water to the system. The make up water may come from either a water tank or it may be condensate from other apparatus in the power plant, such as heat exchangers or condensers. The steam portion of the water is shown being carried away from the separator 46 via a conduit 54. The steam may be used in a steam reforming reaction for the production of hydrogen; or it may simply be condensed and returned into the circulation system via the conduit 52. How this excess steam is utilized is not considered a part of the present invention. The conduits used in the circulation system 40 are electrically conductive (i.e., copper or steel pipe or tubing). These conduits are electrically grounded at 53, but they may be grounded at any number of locations.

Each of the coolers 36, 38 in this embodiment are the same, although this is not a requirement of the present invention, and corresponding parts have the same reference numerals. Each cooler includes an inlet plenum and an outlet plenum 56, 58, respectively, in fluid communication with a plurality of cooler tubes 60 which pass through the separator plates 24a. The tubes 60 and the plates 24a are clearly shown in FIGS. 2 and 3. The cooler tubes 60 are disposed in passageways 62 formed in the plates 24a. The passageways 62 alternate with and are parallel to the channels 34a. Due to manufacturing tolerances it is difficult to avoid air spaces between the tubes 60 and the walls of the passageways 62. Because air is a poor conductor of heat, in order to maximize heat transfer capability of the system these air spaces may be filled with a thermally conductive grease which is compatible with the electrolyte at operating temperatures. The tubes 60 are connected by headers 66, 68 (FIG. 3) and have a common inlet end 70 and a common outlet end 72. The headers 66, 68 and tube ends 70, 72 are both disposed outside the plates 24a, although this is not mandatory.

The tubes 60 are composed of an electrically conductive material such as copper. In order to prevent electric currents produced in the stacks from passing into the coolant water, thereby resulting in shunt currents which potentially can short circuit the cells and corrode the tubes 60 and other components of the cooling system, the external surfaces of the tubes 60 have a coating 73 of dielectric material. Any dielectric material compatible with the environment of the stacks is suitable. Although in this embodiment the external wall surfaces of the tubes 60 are coated with dielectric material the same result may be achieved by coating the internal wall surfaces of the tubes 60.

The coating thickness should be sufficient to withstand the potential drop thereacross for the desired life expectancy of the stack; yet it cannot be so thick as to excessively reduce the heat transfer efficiency of the system. In one stack according to the present invention with copper tubes 60 having an inner diameter of 0.085 in. an outer diameter of 0.125 in. and carrying water as the coolant, it was calculated that a 0.010 in. thick coating of polytetrafluoroethylene (PTFE) on the external surface of the tube could withstand a potential drop of 2000 volts and would perform satisfactorily for at least 40,000 hours. The maximum cell temperature in that calculation was assumed to be 400°F and the electrolyte used in the cells was assumed to be phosphoric acid. Although in this example PTFE is used as the dielectric material, any fluorocarbon polymer may be used.

The preferred number and size of the cooler tubes within a separator plate and the number of separator plates carrying cooler tubes may be determined by persons having ordinary skill in the art and is not a part of the present invention. However, one of the important aspects of the present invention is that water may be used as the coolant; and its high heat of evaporation and heat transfer properties result in lower coolant flow rate requirements thereby permitting the use of small diameter cooler tubes and other cooler conduits. This, in turn, reduces the amount of space heretofore taken up internally and externally of the stack by prior art cooling systems. From FIG. 3, for example, it is apparent that the inclusion of cooler tubes in a separator plate in the manner of the present invention requires a minimum amount of increase in the thickness of the separator plates 24a as compared to the plates 24. The only increase is the one resulting from the need to increase the size of the gas carrying channels 32a so that they may still carry an adequate amount of reactant for proper fuel cell performance. Thus, as compared to the prior art, the distance between the cooler tubes and the cells which it must service is reduced, improving the heat transferring ability of the cooler. The single piece separator plate construction is also highly desirable from a cost standpoint.

Although it is preferable to put the cooler tubes on the hydrogen side of a cell (i.e., in a hydrogen atmosphere) rather than on the oxygen side of a cell (i.e., in an oxygen atmosphere) because an oxygen atmosphere is more corrosive than a hydrogen atmosphere and because most materials are more compatible with the anode electrode, the tubes can be placed in either location as long as suitable materials are chosen or if long life is not critical.

In operation, water in liquid form enters the tubes 60 via the conduits 74. Heat produced by the cells 22 changes a portion of the water to steam (i.e., two phase cooling). The steam and water mixture leaves the tubes 60 via the conduits 76 and are fed to the separator 56 wherein the liquid water is retained in the circulating system 40 and the steam is used elsewhere in the power plant.

In this embodiment the graphite separator plates 24, 24a are porous and tend to become saturated with phosphoric acid electrolyte. Also, the cooler tubes 60 may be in contact with the electrode 28 of the cell which is also saturated with electrolyte. For this reason the dielectric coating 73 on the tubes must be compatible with phosphoric acid. Also, although not desirable, the electrolyte fills in defects or flaws in the dielectric coating, thereby providing a good electrical path to the cooler tubes. In order to assure high reliability, in a preferred embodiment of the present invention the power plant is designed with the assumption that the dielectric coating on one or more of the cooler tubes is initially defective or will become defective early in the life of the power plant. Assume, for example, that the cooler system, including the plenums and the reciculating system, is entirely electrically conductive and is electrically grounded. In that instance, a defect in the dielectric coating of a cooler tube could result in a short circuiting of the power plant since electric current from the electrode 28 or from the separator plate 24a might travel into the cooler tube at the location of the defective dielectric coating (either through direct contact with the electrode or plate, or via electrolyte within the defect) and to ground via the coolant and the conduits of the cooler system.

To prevent this from occurring, in the preferred embodiment of FIG. 1 conduits 74, 76 connect the plenums 56, 58 to the cooler tube ends 70, 72 and are provided with dielectric wall portions 78, 80, respectively. The length to diameter ratio of the dielectric wall portions 78, 80 are chosen such that, should there be a flaw in the dielectric coating, the magnitude of any current flowing in the coolant due to the potential difference between the separator plate 24a and the plenums is reduced to a sufficiently low level which may be 6–8 orders of magnitude less than would be the case without this feature.

Assume, for example, that the dielectric wall portion 78 is a hose made of polytetrafluoroethylene having an inner diameter of 0.178 in. and a length of 5.25 in. Also assume that the water conductivity at operating temperatures is 10 micro-mhos. Further, assume a potential drop of 300 volts from the cooler tube end 70 to the plenum 56. The resulting current will be about 36 × $10^{-6}$ amp. By reducing the current to this low level the problem of shorting the cell is eliminated.

To further reduce this shunt current, in this particular embodiment conduits 88 connecting the circulation system 40 with the plenums 56, 58 also include dielectric wall portions 90 to create high electrical resistance paths through the coolant between the plenums and the circulation system 40. The plenums 56, 58 are connected electrically to the low potential ends of their respective stacks by electrical connectors 82, 84. The maximum potential drop between the cooler tube ends 70, 72 and the plenums 56, 58 is therefore the difference between the potential of the particular separator plate 24a and the potential at the low potential end of its respective stack. Except for the first stack in a group of series connected stacks, this difference in potential is always less than the difference in the potential if the plenums are directly grounded through the circulation system 40.

By eliminating the short circuiting problem a corrosion problem arises at the cooler tube ends 70, 72 which are at the high potential end of the high electrical resistance path created by the dielectric wall portions 78, 80. The metal tube ends 70, 72 act as anode electrodes, while the metal portions of the conduits 74, 76 at the other ends of the high resistance paths act as cathodes. The rate of corrosion at the tube ends 70, 72 is determined by the resistance of the electrolyte path and the impressed voltage difference. Over the short term this corrosion of the tube ends 70, 72 is very slight due to the small magnitude of the current; yet, over long periods of time (i.e., years) the extent of corrosion can be significant. To protect against this corrosion each of the tube ends 70, 72 includes sacrificial electrode material. This sacrificial material may simply be in the form of additional length for the tube ends; or, as in the preferred embodiment of FIG. 1, it may be an insert 86 (best shown in FIG. 4) of, for example, zinc suitably attached to the cooler tube ends. Any material which corrodes at a lower potential than the tube material could be used as sacrificial electrode material. The same feature is provided at the high potential ends 92 of the high electrical resistance paths between the circulation system 40 and the plenums 56, 58.

To further minimize shunt current magnitude it is also preferable that good quality water be used as the coolant, such as water having a resistivity of at least about 20,000 ohm-cm; however, the minimum acceptable resistivity might be much less when long life is not a factor or if other aspects of the cooling system compensate for low coolant resistivity.

Although in the foregoing preferred embodiment the tubes 60 are coated with a dielectric material in the hope of eliminating shunt currents entirely, it may be desirable, in some instances, to permit electric current to flow through the coolant and to simply rely on other aspects of the cooling system to reduce the shunt currents and electrochemical corrosion rates to acceptable levels. In that case non-dielectric coatings that are compatible with the electrolyte may be used on the tubes 60.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a fuel cell stack comprising a plurality of cells connected electrically in series and electrically conductive separator plate means disposed between each pair of adjacent cells, said plate means including a pair of opposed surfaces, one facing each cell, each of said cells comprising an anode electrode and a cathode electrode spaced apart and including a matrix disposed therebetween adapted to hold electrolyte, said surfaces having channels formed therein in gas communication with said electrodes for carrying reactant gases into communication with said electrodes, an improvement to said stack comprising:
    at least one of said opposed surfaces of at least one of said separator plate means in said stack including passageways formed therein parallel to the plane of said surface; and
    cooler means for carrying a coolant into heat exchange relationship with said cells and including a plurality of cooler tubes disposed in said passageways and passing through said plate means.

2. The improvement to said stack according to claim 1 wherein said tubes comprise a material compatible with the electrolyte to be used in the cell.

3. The improvement to said stack according to claim 2 wherein said tubes comprise electrically conductive wall means having an internal surface and an external surface, and said material is a continuous coating on said external surface.

4. The improvement to said stack according to claim 3 wherein said material is a dielectric material.

5. The improvement according to claim 4 wherein said cells include phosphoric acid electrolyte and said dielectric material is a fluorocarbon polymer.

6. A fuel cell power plant cooling system comprising:
    a non-dielectric coolant;
    a load;
    electrical connection means;
    a plurality of fuel cell stacks connected electrically in series to each other via said electrical connection means and connected electrically in series with said load, said series of stacks being connected electrically to ground, each stack comprising a plurality of cells connected electrically in series, each cell comprising an anode electrode and a cathode electrode spaced apart and including an electrolyte retaining matrix disposed therebetween, electrically conductive separator plate means disposed between each pair of adjacent cells in each stack, said plate means including a pair of opposed surfaces, one facing each cell, said surfaces having channels formed therein in gas communication with said electrodes for carrying reactant gases in communication with said electrodes, at least one of said opposed surfaces of at least one of said separator plate means in said stack including passageways formed therein parallel to the plane of said surface, each of said stacks including a cooler, said coolant disposed within said cooler, said cooler including cooler tubes disposed within said passageways and passing through said plate means, said tubes comprising a material compatible with said electrolyte; and
    coolant circulation means connected electrically to ground and in fluid communication with each of said tubes.

7. The fuel cell power plant cooling system according to claim 6 wherein said coolant is water.

8. The fuel cell power plant cooling system according to claim 7 wherein each of said coolers includes conduit means interconnecting said coolers and said circulation means, said conduit means adapted to create a high electrical resistance path through said coolant, said cooler including sacrificial electrode material at the higher potential end of said resistance path.

9. The fuel cell power plant according to claim 8 wherein said tubes comprise electrically conductive wall means having an internal surface and an external surface, and said material is a continuous coating on said external surface and is a dielectric material.

* * * * *